(12) United States Patent
Gupta

(10) Patent No.: US 10,754,685 B2
(45) Date of Patent: Aug. 25, 2020

(54) CROSS-DEVICE TASK REGISTRATION AND RESUMPTION

(71) Applicant: Microsoft Technology Licensing, LLC, Redmond, WA (US)

(72) Inventor: Rahul Gupta, Saharanpur (IN)

(73) Assignee: Microsoft Technology Licensing LLC, Redmond, WA (US)

(*) Notice: Subject to any disclaimer, the term of this patent is extended or adjusted under 35 U.S.C. 154(b) by 200 days.

(21) Appl. No.: 15/449,775

(22) Filed: Mar. 3, 2017

(65) Prior Publication Data

US 2018/0253333 A1    Sep. 6, 2018

(51) Int. Cl.
   *G06F 9/48*    (2006.01)

(52) U.S. Cl.
   CPC ............................ *G06F 9/4856* (2013.01)

(58) Field of Classification Search
   CPC .................................................. G06F 9/4856
   USPC .......................................................... 709/205
   See application file for complete search history.

(56) References Cited

U.S. PATENT DOCUMENTS

| | | | | |
|---|---|---|---|---|
| 8,812,601 | B2* | 8/2014 | Hsieh | G06F 9/4856 709/206 |
| 9,002,930 | B1* | 4/2015 | Want | H04L 67/1097 709/203 |
| 9,098,177 | B2 | 8/2015 | Das | |
| 9,106,721 | B2 | 8/2015 | Quan | |
| 9,172,747 | B2 | 10/2015 | Walters et al. | |
| 9,378,456 | B2 | 6/2016 | White et al. | |
| 10,425,471 | B2* | 9/2019 | Chan | G06F 9/4416 |
| 10,542,375 | B2* | 1/2020 | Oh | H04W 4/023 |
| 2007/0054627 | A1 | 3/2007 | Wormald | |
| 2007/0136392 | A1* | 6/2007 | Oh | G06F 9/44505 |
| 2009/0204966 | A1* | 8/2009 | Johnson | G06F 9/4856 718/100 |
| 2009/0271448 | A1* | 10/2009 | Chen | G06F 11/3476 |
| 2011/0219105 | A1 | 9/2011 | Kryze et al. | |
| 2012/0011511 | A1* | 1/2012 | Horvitz | G06F 9/461 718/100 |
| 2013/0262638 | A1* | 10/2013 | Kumarasamy | G06F 15/177 709/221 |
| 2014/0173447 | A1* | 6/2014 | Das | G06F 3/04842 715/738 |
| 2014/0282257 | A1* | 9/2014 | Nixon | G05B 11/01 715/835 |
| 2014/0359637 | A1 | 12/2014 | Yan | |

(Continued)

OTHER PUBLICATIONS

Chang, Tsung-Hsiang, Li, Yang, "Deep Shot: A Framework for Migrating Tasks Across Devices Using Mobile Phone Cameras" May 7, 2011, https://dl.acm.org/citation.cfm?id=1979257 (Year: 2011).*

(Continued)

*Primary Examiner* — Tauqir Hussain

(57) ABSTRACT

Systems and methods are disclosed for cross-device task registration and resumption. In one implementation, a task can be received from a task registration service of a first device associated with a user. Such a task can include an application identifier that identifies an application that executes on the device. A notification that the user has accessed a second device can be received. In response to the notification, the task can be provided to a task resumption service of the second device.

20 Claims, 6 Drawing Sheets

(56) References Cited

U.S. PATENT DOCUMENTS

| | | | | |
|---|---|---|---|---|
| 2014/0379811 | A1* | 12/2014 | Chan | G06F 16/125 |
| | | | | 709/205 |
| 2015/0032889 | A1* | 1/2015 | Chan | H04L 67/1095 |
| | | | | 709/224 |
| 2015/0088957 | A1 | 3/2015 | Kuo | |
| 2015/0172463 | A1 | 6/2015 | Quast et al. | |
| 2016/0112501 | A1* | 4/2016 | Wheeler | H04L 67/104 |
| | | | | 709/204 |
| 2016/0192173 | A1 | 6/2016 | Ghosh et al. | |
| 2016/0259656 | A1 | 9/2016 | Sumner et al. | |
| 2017/0205980 | A1* | 7/2017 | Rainisto | G06F 9/4856 |
| 2018/0284959 | A1* | 10/2018 | Alphin, III | G06F 16/2228 |

OTHER PUBLICATIONS

Dunlop, et al., "Digital Personal Assistant for the Enterprise", in White Paper of Intel, Feb. 2013, pp. 1-8.

Austrem, Paul G., "Seamless Application" for seamless and personal mobile computing, In Proceedings of the 14th Conference on Pattern Languages of Programs, Sep. 5, 2007 , 8 pages.

"Mobile Device Management at Microsoft", https://msdn.microsoft.com/en-us/library/mt210918.aspx, Feb. 2016, 14 pages.

"International Search Report & Written Opinion Issued in PCT Application No. PCT/US2018/019615", dated Jun. 5, 2018, 10 Pages.

* cited by examiner

CROSS-DEVICE TASK REGISTRATION AND RESUMPTION

TECHNICAL FIELD

Aspects and implementations of the present disclosure relate to data processing and, more specifically, but without limitation, to cross-device task registration and resumption.

BACKGROUND

With the increased availability of electronic devices such as smartphones, tablets, computers, etc., a single user can utilize several devices. Many of these devices include the same or similar capabilities and certain applications (e.g., media player applications, web browsers) are available for many different devices.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, a task is received from a task registration service of a first device associated with a user. Such a task can include an application identifier that identifies an application that executes on the device. A notification that the user has accessed a second device is received. In response to the notification, the task is provided to a task resumption service of the second device.

In another aspect, a task is registered at a first device associated with a user. Such a task can include an application identifier that identifies an application that executes on the first device, an action associated with the application as executed on the first device, a content item associated with the application as executed on the first device, and an operation state associated with the application as executed on the first device. Such a task is provided to a task management service.

In yet another aspect, a task is received at a first device associated with a user. Such a task can include an application identifier that identifies an application that executed on a second device associated with the user, an action associated with the application as executed on the second device, a content item associated with the application as executed on the second device, and an operation state associated with the application as executed on the second device. Such a task can be resumed at the first device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
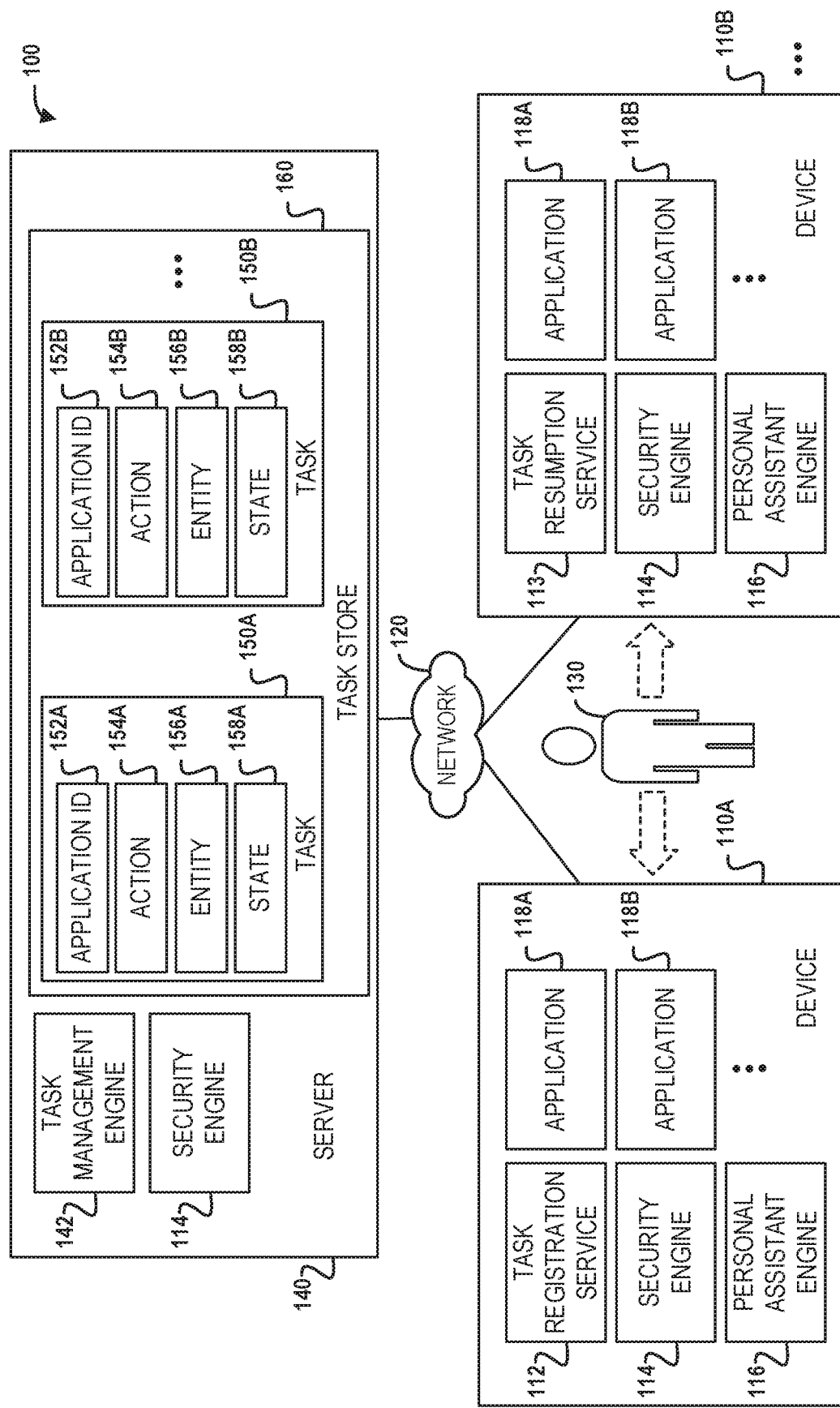
FIG. 1 illustrates an example system, in accordance with an example embodiment.

Aspects and implementations of the present disclosure are directed to cross-device task registration and resumption.

It can be appreciated that a single user can utilize multiple devices (e.g., a smartphone, tablet device, personal computer). For example, it can be more convenient for a user to utilize a portable device (e.g., a smartphone) while traveling and a non-mobile device (e.g., a personal computer (PC)) while stationary. Additionally, a user can have a preference for one device (when available) over another. Accordingly, even when a user is utilizing one device (e.g. a smartphone), in certain scenarios (e.g., when the user arrives at his/her office) it can be advantageous for the user to transition to another device (e.g., a PC). In such a scenario, the user's first device can be running various applications (e.g., a media player application that is playing a song, video). Though the user can wish to resume such application(s) at the second device (e.g., the PC) to which he/she is transitioning to, existing technologies do not enable or provide a framework for such task resumption. Instead, the user is left to manually resume each application at the second device. Additionally, existing technologies do not provide a framework that enables a user to manage multiple tasks (each of which may correspond to a different application) and to resume such task(s) (e.g., at a different device).

Accordingly, described herein in various implementations are technologies, including methods, machine readable mediums, and systems, that enable tasks to be captured/registered at a first device. The referenced tasks can reflect various aspects of the application(s) as they are running on a user's first device (e.g., what operation(s) an application is currently performing). Upon registering such task(s) at a first device, the task(s) can be provided to and stored in a central task store. Upon determining that the user has transitioned to a second device, the stored task(s) can be provided to such a device and resumed there. In doing so, a common platform can be provided through which task(s) associated with multiple applications can be registered (e.g., at one device) and subsequently resumed at other device(s).

Additionally, in certain implementations the referenced task resumption framework can be implemented in conjunction with a personal assistant application or service. Such a personal assistant can provide an interface (e.g., a visual and/or audio communication interface) through which a user can request and/or receive information, content, etc. (e.g., contextually relevant content). The personal assistant can also enable a user to initiate and/or configure various aspects of applications running on a device. Accordingly, as described herein, the personal assistant can provide a common/central interface through which a user can manage various tasks. For example, the personal assistant can enable a user to provide input/approval at one device with respect to whether or not to register a particular task. By way of further example, the personal assistant can notify a user at another device of various stored task(s) that can be resumed. In doing so, the personal assistant provides a common interface through which a user can manage and resume multiple tasks which pertain to multiple applications.

It can therefore be appreciated that the described technologies are directed to and address specific technical challenges and longstanding deficiencies in multiple technical areas, including but not limited to application management, device management, and personal assistant communication interfaces. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates an example system 100, in accordance with some implementations. As shown, the system 100 includes various devices such as device 110A and device 110B (collectively device(s) 110). Each device 110 can be a laptop computer, a desktop computer, a terminal, a mobile phone, a tablet computer, a smart watch, a personal digital assistant (PDA), a digital music player, a server, and the like. User 130 can be a human user who interacts with device(s) 110. For example, user 130 can provide various inputs (e.g., via an input device/interface such as a keyboard, mouse, touchscreen, etc.) to device(s) 110A. Device(s) 110 can also display, project, and/or otherwise provide content to user 130 (e.g., via output components such as a screen, speaker, etc.). As described herein, user 130 can interact with one device (e.g., device 110A) at one time and later interact with another device (e.g., device 110B).

Figure 6:
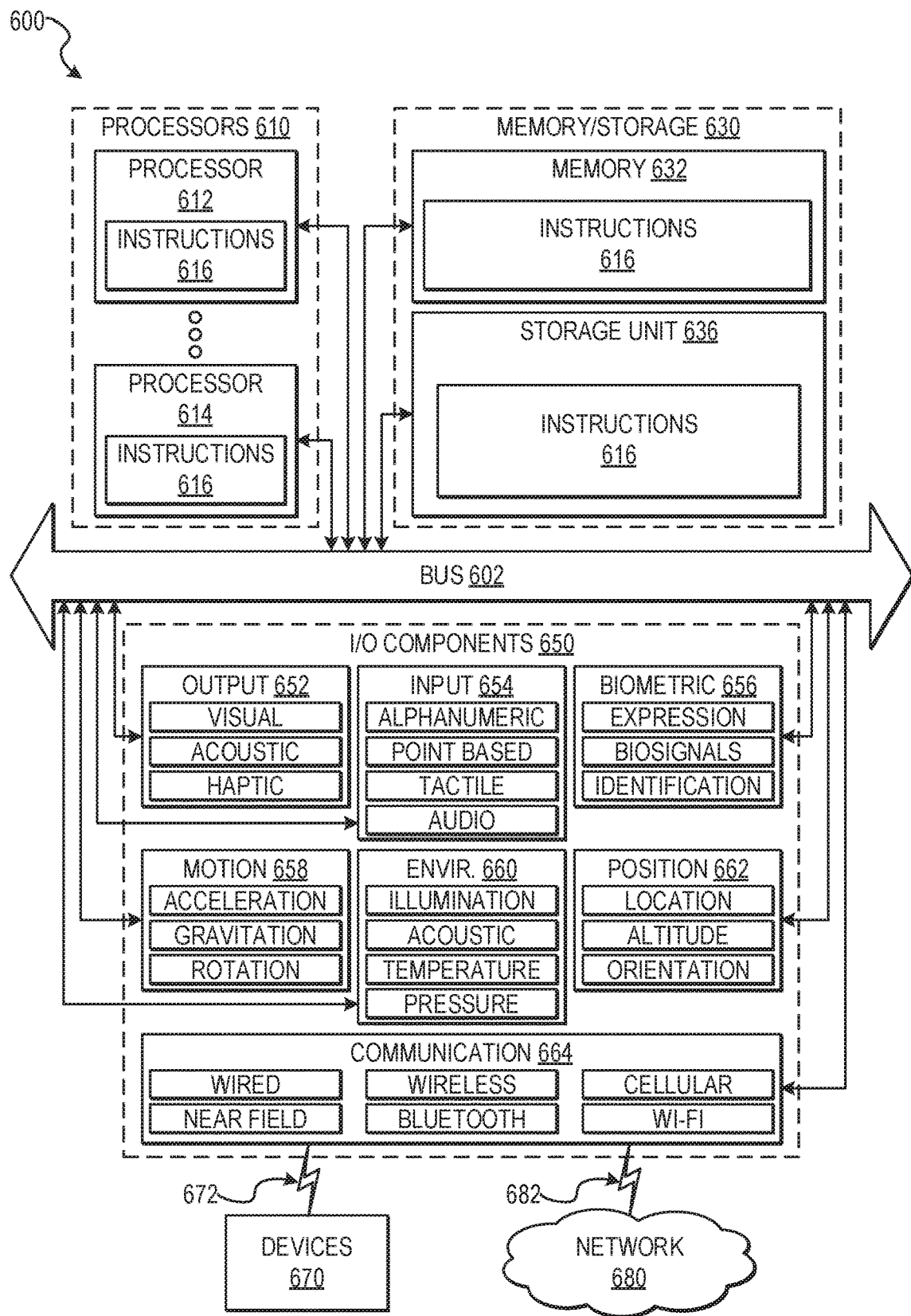
FIG. 6 is a block diagram illustrating components of a machine able to read instructions from a machine-readable medium and perform any of the methodologies discussed herein, according to an example embodiment.

As shown in FIG. 1, device 110A can include various applications such as application 118A and application 118B (collectively, application(s) 118). Each application 118 can be stored in memory of device 110 (e.g. memory 630 as depicted in FIG. 6 and described below). One or more processor(s) of device 110 (e.g., processors 610 as depicted in FIG. 6 and described below) can execute such application(s). In doing so, device 110 can be configured to perform various operations, present content to user 130, etc. Examples of application(s) 118 include but are not limited to: web browsers, media players, social media/messaging applications, content creation applications, mobile 'apps,' etc.

As shown in FIG. 1, device 110A can also include task registration service 112, security engine 114, and personal assistant engine 116. Each of task registration service 112, security engine 114, and personal assistant engine 116 can be, for example, an application or module stored on device 110A (e.g., in memory of device 110A). When executed (e.g., by processor(s) of device 110A), such service(s)/ engine(s) configure or otherwise enable device 110A to perform various operations such as are described herein.

For example, task registration service 112 can configure or enable device 110A to capture or register various task(s) associated with an application 118 executing on device 110A. Each of the referenced task(s) can be, for example, a record that reflects various aspects of the execution of the application at the device. Further aspects of the referenced task(s) are described in detail below.

As also shown in FIG. 1, in certain scenarios user 130 can utilize other device(s) such as device 110B. For example, user 130 can initially utilize device 110A (e.g., a smartphone device) and then later utilize device 110B (e.g., a desktop computer). Such a device 110B can include task resumption service 113, which can be an application or module that configures/enables device 110B to perform various operations such as are described herein. For example, task resumption service 113 can configure or enable device 110B to receive previously registered/captured task(s) (e.g., a task registered at device 110A). Upon receiving such task(s), task resumption service 113 can resume the task, e.g., in conjunction with various application(s) 118 executing at device 110B, as described in detail below.

Security engine 114 can configure/enable the device to ensure the security of the task(s) captured/registered by task registration service 112 and/or resumed by task resumption service 113. For example, it can be appreciated that certain applications 118 (and/or content presented within them) can be sensitive, confidential, private, etc. Accordingly, security engine 114 can operate in conjunction with task registration service 112/task resumption service 113. In doing so, user 130 can, for example, 'opt-in,' 'opt-out,' and/or otherwise configure various security parameters, settings, etc., with respect to the operation of the described technologies. For example, the user can configure what types of tasks should or should not be registered/resumed (e.g., don't store tasks for finance-related applications.). Additionally, security engine 114 can utilize data encryption, identity verification, etc., to ensure that the registered tasks cannot be accessed/ retrieved by unauthorized parties. In doing so, security engine 114 can ensure that the described technologies enable the described benefits and technical improvements to be realized while maintaining the security and privacy of the user's data.

Additionally, in certain implementations security engine 116 can be configured to limit or prevent the registration and/or resumption of various tasks that can compromise the security/stability of a device. For example, various system or operating system (OS)-level tasks can malfunction or cause instability or damage if they are resumed at another device. Accordingly, security engine 116 can be configured to identify such tasks and to limit or prevent their registration and/or resumption. For example, in certain implementations security engine 116 can be configured to only enable the resumption of a system or OS-level task at the same device at which such a task was captured. In other implementations, security engine 116 can be configured to only enable the registration/resumption of tasks that do not effect system or OS-level functionality (and/or are otherwise determined not to cause etc., on the device at which they are being resumed).

Personal assistant engine 116 can configure/enable the device to interact with, provide content to, and/or otherwise perform operations on behalf of user 130. For example, personal assistant engine 116 can receive request(s) from user 130 and present/provide responses to such request(s) (e.g., within a conversational or 'chat' interface). In certain implementations, personal assistant engine 116 can also identify content that can be relevant to user 130 (e.g., based on a location of the user or other such context) and present such content to the user. Personal assistant engine 116 can also enable user 130 to initiate and/or configure various aspects of applications 118. For example, user 130 can provide a command to personal assistant engine 116 (e.g., 'play jazz music'). In response to such command, personal assistant engine 116 can initiate an application 118 (e.g., a media player application).

Additionally, in certain implementations personal assistant engine 116 can enable user 130 to manage various tasks

150. For example, as shown in FIG. 1, personal assistant engine 116 can execute on device 110A in conjunction with task registration service 112. In doing so, personal assistant engine 116 can, for example, prompt user 130 to provide input/approval with respect to the registration of a task 150 with respect to a particular application 118. Moreover, as also shown in FIG. 1, personal assistant engine 116 can execute on device 110E in conjunction with task resumption service 113. In doing so, personal assistant engine 116 can, for example, notify user 130 of various stored task(s) that can be resumed.

While device 110A is depicted as executing task registration service 112 and/device 110B is depicted as executing task resumption service 113, such depiction is only for the sake of clarity. However, it should be understood that each of the depicted devices can include both task registration service 112 and task resumption service 113. Moreover, in certain implementations both task registration service 112 and task resumption service 113 can execute concurrently on a single device 110. For example, task registration service 112 can register/capture a task with respect to one application 118A while task resumption service 113 is resuming a task with respect to another application 118E on the same device. In an example, the task registration server 112 and task resumption service can operate as a single service.

It should also be noted that while various components (e.g., task registration service 112, task resumption service 113, security engine 114) are depicted (e.g., in FIG. 1) as operating on a device (e.g., device 110A and/or device 110B), this is only for the sake of clarity. However, it should be understood that, in other implementations, the referenced components (e.g., task registration service 112, task resumption service 113, security engine 114) can also be implemented on other devices/machines. For example, in lieu of executing locally at device 110, task resumption service 113 can be implemented remotely, e.g., at server 140 (e.g., on a server device or within a cloud service or framework).

As also shown in FIG. 1, devices 110A and 110B can be connected to and/or otherwise communicate with server 140 via network 120. Network 120 can include one or more networks such as the Internet, a wide area network (WAN), a local area network (LAN), a virtual private network (VPN), an intranet, and the like. Server 140 can be, for example, a server computer, computing device, storage service (e.g., a 'cloud' service), etc., and can include task management engine 142, security engine 114, and task store 160.

Task management engine 142 can be an application or module that configures/enables server 140 to perform various operations such as are described herein. For example, task management engine 142 can configure or enable server 140 to receive task(s) 150 (e.g., from device 110A), store such task(s) (e.g., in task store 160), and provide such task(s) (e.g., to device 110B) for resumption.

Task store 160 can be, for example, a database or repository that stores various information, such as task(s) 150 that are captured/registered at and/or otherwise provided by device(s) 110. FIG. 1 depicts an example scenario in which task 150A and task 150B are stored in task store 160. As also shown in FIG. 1, task 150A can include elements such as an application identifier ('application ID') 152A, action 154A, entity 156A, and state 158A. Other tasks 150 stored in task store 160 (e.g., task 150B) can also include similar/comparable elements (e.g., application ID 152B, action 154B, entity 156B, and state 158B, as shown in FIG. 1).

Application ID 152A can be, for example, an identifier (or any other such information or data element) that reflects or otherwise indicates the application(s) 118 with respect to which the task 150A pertains to. Such an application ID 152A can, for example, reflect or specify the particular application 118A executing on device 110A with respect to which the task 150A was registered (e.g., by task registration service 112). Additionally, in certain implementations application ID 152A can reflect or indicate the type or class of application with respect to which the task 150A was captured/registered. For example, application ID 152A can reflect or specify that the task 150A was registered with respect to a media player application, web browser application, etc. Various additional information or parameters can also be included. For example, application ID 152A can also reflect the particular version of the application that task 150A is captured with respect to. By way of further example, application ID 152A can also reflect the operating system (OS) within which the application (that task 150A is captured with respect to) is executing. Such information/parameters can be further accounted for, e.g., in a scenario in which the task is to be resumed on a device having a different version of the application and/or a different OS, as described herein.

Action 154A can be, for example, be a parameter (or any other such information or data element) that reflects or otherwise indicates operation(s), function(s), etc., being performed by the application(s) 118 when the task 150A was registered/captured. For example, with respect to a media player application, such an action 154A can be a 'play music' operation performed by the application.

Entity 156A can be, for example, be a content item and/or a content source (or any other such information or data element) that reflects or otherwise indicates the content on which the application(s) 118 is performing action 154A. For example, entity 156A can be a media file (e.g., an audio file that corresponds to a song) and/or the location or network path of such a file that is being played by a media player application.

State 158A can be, for example, be a status or progression (or any other such information or data element) that reflects or otherwise indicates aspects of the manner in which the application(s) 118 have performed action 154A with respect to entity 156A. For example, entity 158A can reflect the degree to which a 'play music' action has been performed by a media player application with respect to a particular song (e.g., 2 minutes and 30 seconds of the song have been played).

As noted above, security engine 114 can configure/enable server 114 to ensure the security of the task(s) 150 managed by task management engine 142 and/or stored in task store 160. For example, security engine 114 can utilize data encryption, identity verification, etc., to ensure that tasks 150 registered by a user 130 are only provided for resumption at another device upon successful identity verification of the user 130 at such device.

While many of the examples described herein are illustrated with respect to a single server 140, this is simply for the sake of clarity and brevity. However, it should be understood that the described technologies can also be implemented (in any number of configurations) across multiple servers and/or other computing devices/services.

Further aspects and features of devices 110 and server 140 are described in more detail in conjunction with FIGS. 2-6, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
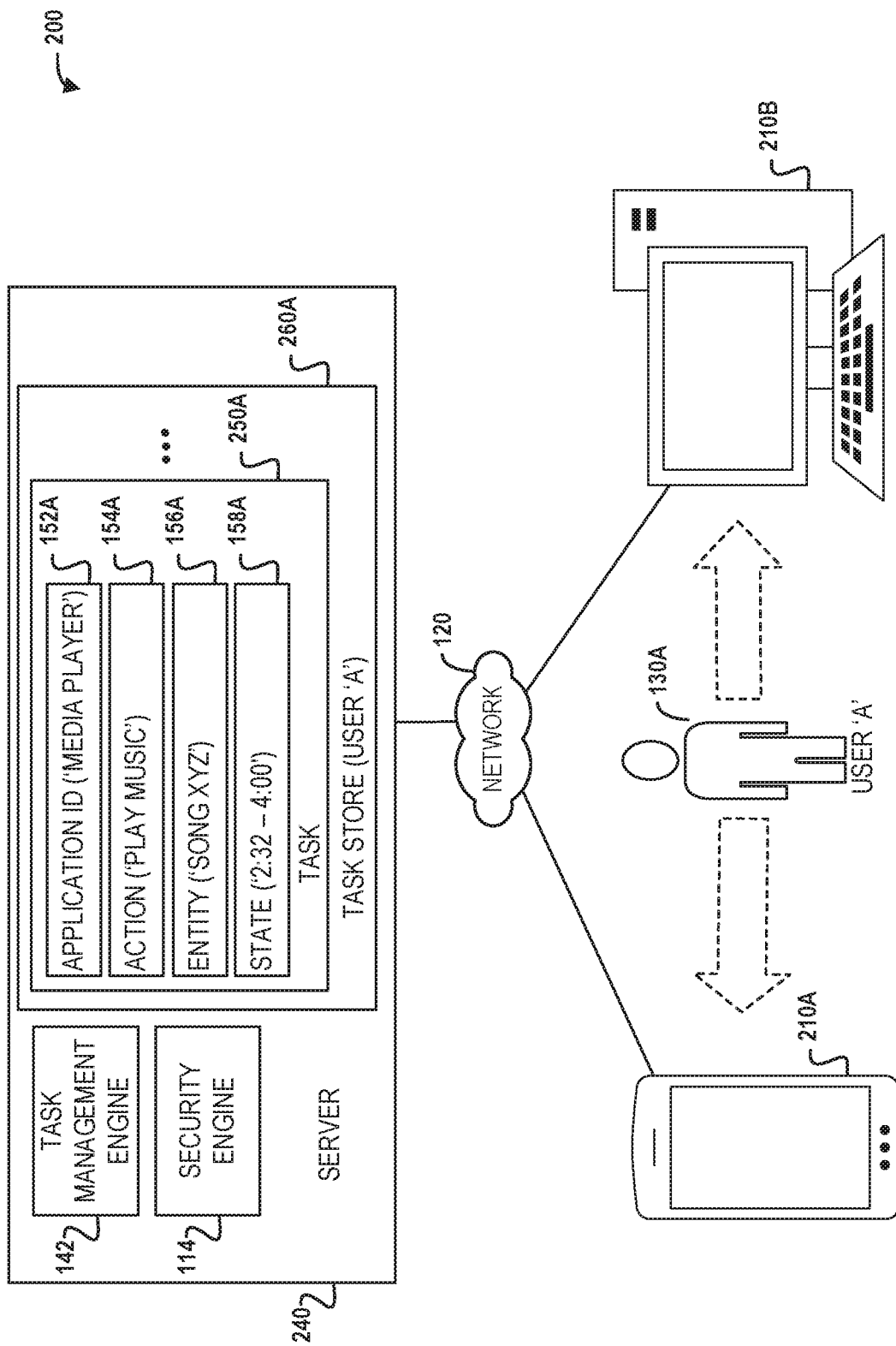
FIG. 2 illustrates one example scenario described herein, according to an example embodiment.
Figure 3:
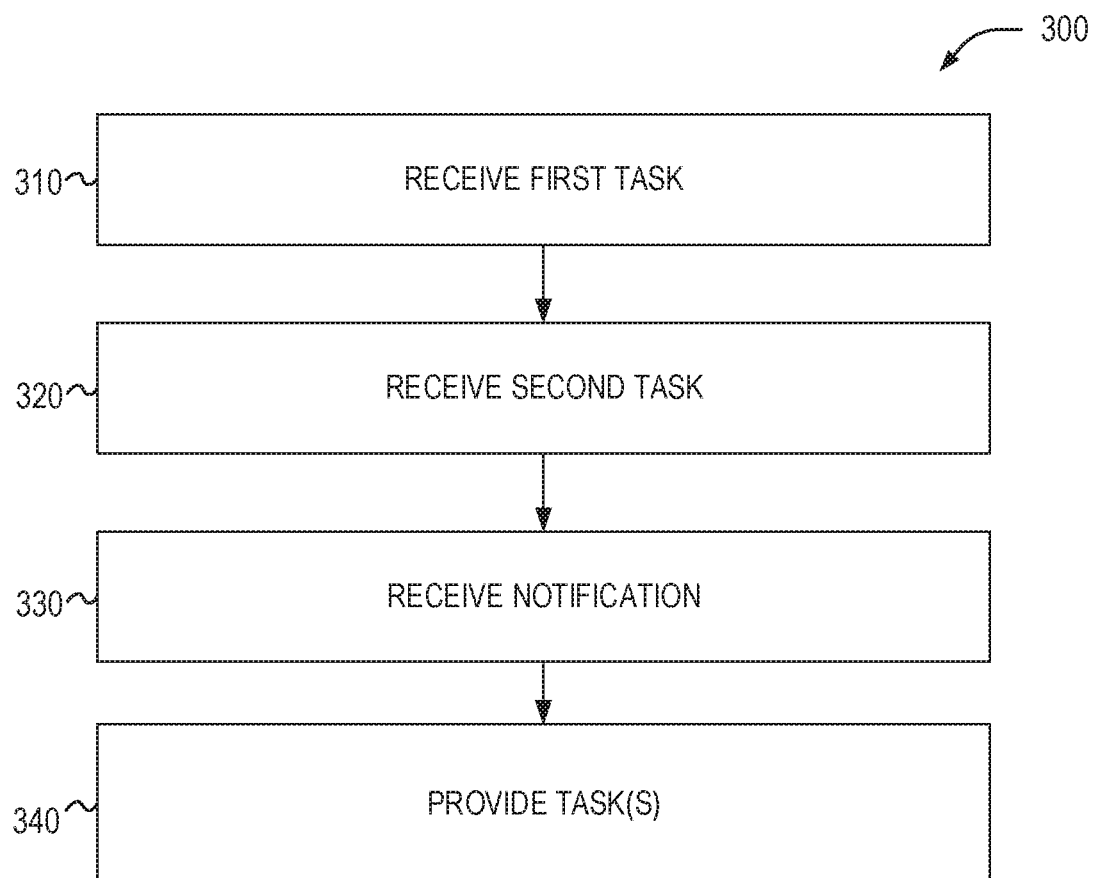
FIG. 3 is a flow chart illustrating a method, in accordance with an example embodiment, for cross-device task registration and resumption.

FIG. 3 is a flow chart illustrating a method 300, according to an example embodiment, for cross-device task registration and resumption. The method is performed by processing logic that can comprise hardware (circuitry, dedicated logic, etc.), software (such as is run on a computing device such as those described herein), or a combination of both. In one implementation, the method 300 is performed by one or more elements depicted and/or described in relation to FIG. 1 and/or FIG. 2 (including but not limited to server 140), while in some other implementations, the one or more blocks of FIG. 3 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 310, a first task is received. In certain implementations, such a task is received from a task registration service. Such a task registration service 112 can execute on a first device associated with a user 130 (e.g., device 110A as shown in FIG. 1). The referenced task 150 can include various elements such as an application identifier 152. Such an application identifier can identify an application 118 that executes on the device (e.g., the device 110 from which the task 150 is received). In certain implementations, various aspects of operation 310 (as well as the other operations described with respect to FIG. 3) are performed by server 140 and/or task management engine 142 (e.g., as depicted in FIG. 1). In other implementations, such aspects can be performed by one or more other elements/components, such as those described herein.

By way of illustration, FIG. 2 depicts an example scenario 200 in which user 130A utilizes device 210A (e.g. a smartphone). As shown in FIG. 2, task 250A is received from device 210A and stored in task store 260A of server 240. Task 250A can include application identifier 152A which reflects that the task 250A was registered/captured (e.g. at device 210A) with respect to a media player application.

As noted above, the referenced task(s) can include various additional elements. For example, such task(s) can further include an action 154, such as an action associated with the application that executed on the first device (e.g., when the task was registered). By way of further illustration, such an action can be a parameter, data element, etc. that reflects/indicates operation(s), function(s), etc., performed by an application when the task was registered/captured. For example, as shown in FIG. 2, action 154A is a 'play music' operation, reflecting that a media player application was performing such an operation (e.g., at device 210A) when the task 250A was registered.

In certain implementations, the referenced task(s) can further include a content item or entity 156. Such a content item/entity 156 can be a content item, content source, etc. that reflects/indicates the content on which the application(s) 118 is performing action 154A. For example, as shown in FIG. 2, content item/entity 156A can be a media file (e.g., an audio file of 'Song XYZ') and/or the location or network path of such a file that is being played by a media player application.

The referenced task(s) can also include state 158. The referenced state can be, for example, an operation state associated with the application 118 that executed on the device (e.g., when the task was registered). For example, the referenced state can be a status or progression that reflects aspects of the manner in which application(s) 118 performed action 154A with respect to entity 156A. For example, as shown in FIG. 2, entity 158A reflects the status of the 'play music' action 154A performed by a media player application with respect to 'Song XYZ' 156A. Specifically, as shown in FIG. 2, state 158A reflects that 2 minutes and 32 seconds (out of 4 minutes) of 'Song XYZ' have been played (e.g., at the time the task 250A was registered at device 210A). By way of further example, a state of another task can reflect that a user is currently reading page 11 (out of 26 pages) of a document. Accordingly, it should be understood that the described technologies (e.g., in conjunction with the described task registration and task resumption services) can register/capture the state of a task with respect to practically any application, and subsequently enable the resumption of such task (e.g., at another device), as described herein.

Moreover, in certain implementations the referenced task is received in response to a user input. Such a user input can be provided to and/or received at a device (e.g., device 110A as shown in FIG. 1). Moreover, in certain implementations such an input is received with respect to an application (e.g., an application executing on the device). That is, it can be appreciated that the described technologies can be configured to capture/register various task(s) 150 in an automated fashion. For example, task registration service 112 can be configured to automatically register a task associated with a particular application (e.g., a web browser) on a periodic/ongoing basis (e.g., every three minutes). In contrast, the user can also configure task registration service 112 to capture/register task(s) associated with other applications in response to particular input(s). For example, task registration service 112 can be configured to register a task associated with a media player application when a specific input is provided received (e.g., 'pause music' input). In doing so, task registration service 112 can preserve processing resources, network bandwidth, etc., by registering task(s) at intervals that the user is more likely to stop using a certain device/application (e.g., when selecting 'pause').

At operation 320, a second task is received. In certain implementations, such a task 150 is received from another application that executes on a device. For example, as shown in FIG. 1, task 150A is received from device 110A with respect to application 118A and task 150B is received from device 110A with respect to application 118B.

At operation 330, a notification is received. In certain implementations, such a notification can reflect that the user 130 (e.g., the user with respect to which the tasks 150 captured at operation(s) 310 and/or 320 were registered) has accessed a second device. For example, as shown in FIG. 2, server 240 can receive a notification that user 130A (who had previously accessed device 210A) has now accessed device 210B. As noted above, such a notification can include and/or otherwise reflect various aspects of the verification of the identity of user 130A.

Moreover, in certain implementations the referenced notification can include and/or reflect a notification that the user has initiated an application (e.g., on the second device). For example, as shown in FIG. 1, user 130 can utilize device 110A to execute application 118A, and a task 150A of such application is stored in task store 160. Subsequently, when utilizing device 110B, user 130 can initiate, launch, activate, etc., application 118A. Upon launching such application 118A, device 110B transmits a notification which is received by server 140. Such a notification can reflect that the user has initiated the application 118A (e.g., on the second device 110B).

Additionally, in certain implementations the referenced notification can include and/or reflect a request for a task (e.g., the task received at operation 310). For example, in certain scenarios a user may not wish to resume some or all previously registered task(s) 150. Accordingly, in certain implementations the user can initially be presented with a prompt that provides the user with the option to request various task(s) 150 from server 140. For example, user 130 can initially be presented with a graphical interface (e.g., via personal assistant engine 116) indicating that various task(s) 150 are stored and can be resumed on the device 110B. Upon receiving a selection of a particular task, a notification (which requests the selected task) is transmitted to/received by server 140. In doing so, computing resources, bandwidth, etc., can be preserved by providing the referenced task(s) 150 when they are requested by the user 130.

At operation 340, a task (e.g., the task received at operation 310) is provided to a second device (e.g., the device from which the notification was received at operation 330). In certain implementations the task is provided to the task resumption service 113 of the device. Moreover, in certain implementations the task is provided in response to a notification (e.g., in response to receipt of the notification at operation 330). For example, as shown in FIG. 2, user 130A (who previously utilized device 210A, e.g., a smartphone) can log on to or otherwise access device 210B (a desktop computer). Upon accessing device 210B, a notification is transmitted by device 210B and received by server 240. In response to such notification, task 250 (which had been received from device 210A) is provided to device 210B. In doing so, user 130A can resume the task at device 210B in an efficient and seamless manner.

Moreover, various instructions can also be incorporated within and/or provided in conjunction with the referenced task 150 (e.g., the task provided to the second device utilized by the user 130). For example, the task can include/be accompanied by an instruction to install the application (e.g., the application to which the task pertains) at the second device. That is, it can be appreciated that a user can wish to resume a task 150 on a device upon which the associated application is not installed. Accordingly, the task 150 provided to such a device can include an instruction to install the application 118 with respect to which the task is associated. Such an instruction can, for example, include a link, location, etc., at which the application can be downloaded or otherwise obtained. In doing so, the user can resume a task on a device upon which the associated application is not initially installed (e.g., by using the instruction to install the application and then resuming the task).

It should be understood that, in certain implementations, multiple tasks can be provided to a device. For example, as shown in FIG. 1, task store 160 can receive both task 150A and task 150B from device 110A. Task 150A can be associated with application 118A (e.g., a media player application) while task 150B is associated with application 118B (e.g., a web browser). Upon receiving a notification from device 110B (e.g., reflecting that user 130 has logged on to such a device), both task 150A and task 150B can be provided to the device 110B. In doing so, the user can resume multiple tasks (e.g., those associated with multiple applications) at device 110B in an efficient/automated fashion.

Additionally, in certain implementations, in scenarios in which multiple tasks (which can correspond to multiple applications) can be resumed, the manner in which such resumption is performed can be dictated based on the ranking and/or prioritization of the referenced tasks. For example, in certain implementations, the referenced tasks can be assigned a weight or raking value which can reflect the significance or importance associated with the resumption of such a task. Such a ranking can be computed/dictated based on various factors such as the amount of time a user is determined to spend using the application to which the task corresponds. For example, the longer the user utilizes an application, the greater the importance/significance of task(s) registered with respect to such application. Other factors can also be accounted for in determining/computing such a ranking. For example, in certain implementations the most recently captured tasks can be provided/resumed first. In other implementations, the oldest captured tasks can be provided/resumed first. It should also be noted that multiple factors (e.g., the amount of time a user spends in an application as well as how long ago the task was registered) can be used to determine/compute the referenced ranking/prioritization value. As noted, such a ranking can dictate which task(s) are to be provided/resumed first (e.g., in lieu of providing/resuming many stored tasks at the same time).

In certain implementations, a task can be provided in response to a specific request for the task. For example, as noted above, in certain implementations task(s) can be provided in an automated fashion (e.g., when a user logs on to a second device). In other implementations, such task(s) can be provided in response to an affirmative request/selection of the task. In such scenarios, personal assistant engine 116 can, for example, initially present the user with option(s) to select task(s) stored at server 140 that can be resumed on device 110B. Upon receiving a selection of a particular task, a request can be transmitted to/received by server 140 and the requested task 150 can be provided in response.

Additionally, in certain implementations the referenced task(s) can be provided (e.g., to device 110B) in a periodic, continuous, and/or ongoing basis. For example, the described technologies can be configured to maintain certain task(s) on multiple devices (e.g., devices 110A and 110B). By way of illustration, in a scenario in which a user frequently switches back and forth between devices (e.g., with respect to particular task(s)), the described technologies can register such task(s) (e.g., at the device currently being used by the user) and resume them at the other device(s) on a continuous/ongoing basis.

It should also be noted that while many of the examples provided herein pertain to the registration/capture of a task on one device and the resumption of the task at another device, the described technologies are not so limited. For example, the described technologies can also be configured to capture/register a task at a device, and to subsequently resume the task at the same device. By way of illustration, the described technologies can enable various task(s) from a device to be registered and stored. The user may then turn off, log out of, etc., the device. Subsequently (e.g., when the user logs back onto the device), the described technologies can be used to resume the registered task(s) on the same device.

Figure 4:
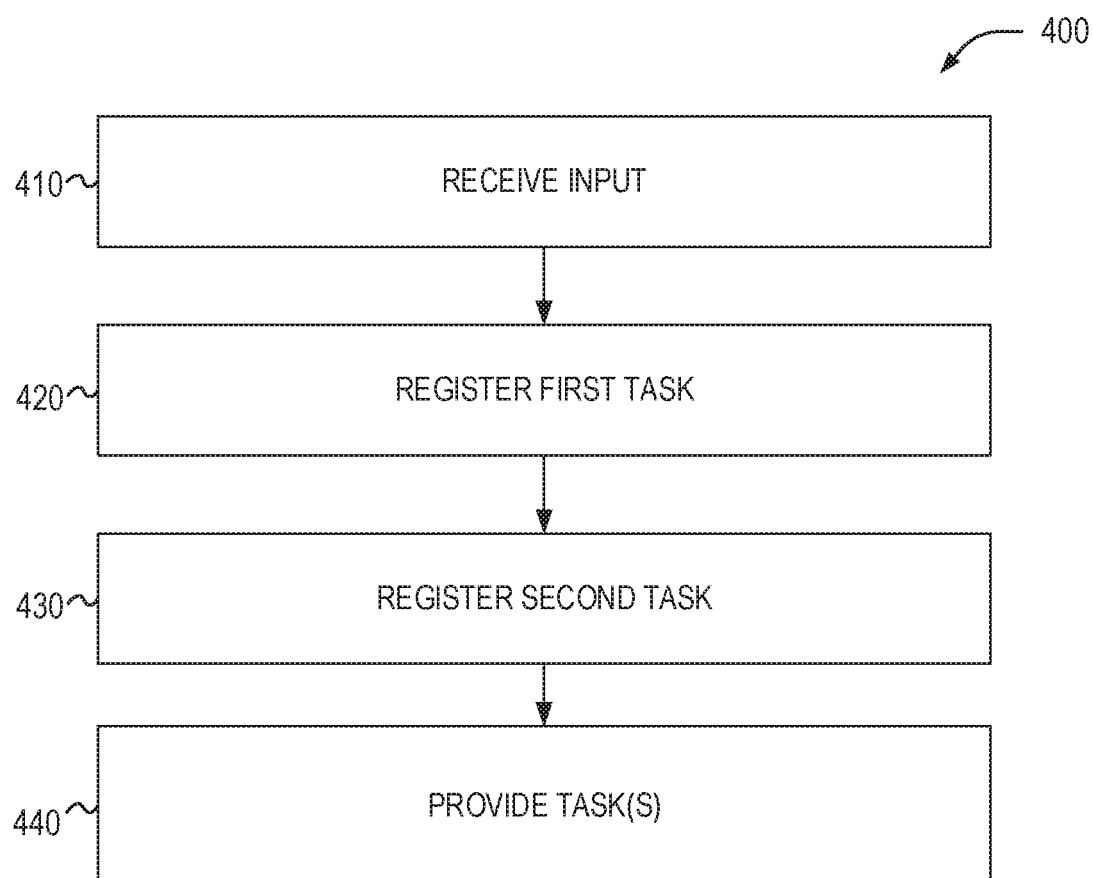
FIG. 4 is a flow chart illustrating another method, in accordance with an example embodiment, for cross-device task registration and resumption.

FIG. 4 is a flow chart illustrating a method 400, according to an example embodiment, for cross-device task registration and resumption. The method is performed by processing logic that can comprise hardware (circuitry, dedicated logic, etc.), software (such as is run on a computing device such as those described herein), or a combination of both. In one implementation, the method 400 is performed by one or more elements depicted and/or described in relation to FIG. 1 and/or FIG. (including but not limited to device 110A), while in some other implementations, the one or more blocks of FIG. 4 can be performed by another machine or machines.

At operation 410, an input is received. In certain implementations, such an input is received at a first device (e.g., device 110A as depicted in FIG. 1). Moreover, in certain implementations such an input is received with respect to a first application (e.g., application 118A as executing on device 110A). For example, such an input can correspond to a selection provided by user 130 (e.g., via personal assistant engine 116) indicating that a task associated with application 118A should be registered. In certain implementations, various aspects of operation 410 (as well as the other operations described with respect to FIG. 4) are performed by device 110A and/or task registration service 112 (e.g., as depicted in FIG. 1). In other implementations, such aspects can be performed by one or more other elements/components, such as those described herein.

At operation 420, a first task 150 is registered. In certain implementations, such a task is registered at device 110A. Such a device 110A can be a device associated with a user 130 (e.g., a device that the user has logged in to using his/her user account). As described in detail above, the referenced task that is registered/captured at device 110A can include various elements (e.g., application identifier, action, content item/entity, and/or operation state, each of which is described in detail above). For example, task registration service 112 can access application 118A (and/or related processes or information on device 110A that relate to the application). By accessing the application (and/or related processes or information), the various elements (action, operation state, etc.) can be identified and the task 150 can be registered/captured by task registration service 112.

At operation 430, a second task can be registered. In certain implementations, such a second task can be related to a second application that is executing on the device (e.g., application 118B, as shown in FIG. 1).

At operation 440, the first task (e.g., as registered at operation 420) and/or the second task (e.g., as registered at operation 430) is provided or otherwise transmitted. In certain implementations, such tasks are transmitted to a task management service (e.g., task management engine 142 as executing on server 140).

Figure 5:
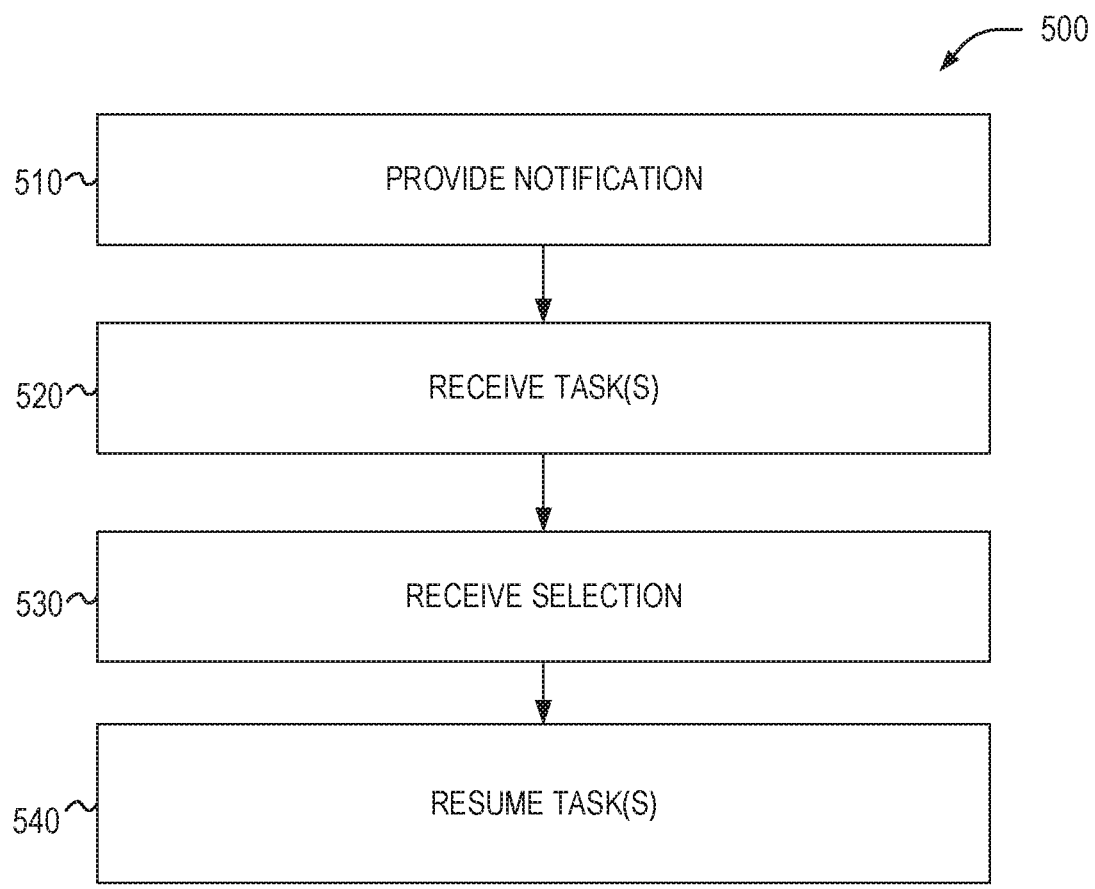
FIG. 5 is a flow chart illustrating yet another method, in accordance with an example embodiment, for cross-device task registration and resumption.

FIG. 5 is a flow chart illustrating a method 500, according to an example embodiment, for cross-device task registration and resumption. The method is performed by processing logic that can comprise hardware (circuitry, dedicated logic, etc.), software (such as is run on a computing device such as those described herein), or a combination of both. In one implementation, the method 500 is performed by one or more elements depicted and/or described in relation to FIG. 1 and/or FIG. 2 (including but not limited to device 110B), while in some other implementations, the one or more blocks of FIG. 5 can be performed by another machine or machines.

At operation 510, a notification is provided. In certain implementations, such a notification is provided to a task management service (e.g., task management engine 142 of server 140). Such a notification can, for example, reflect or otherwise indicate that a particular user has accessed a particular device (e.g., logged on to the device with his/her user account). For example, when user 130 logs on to device 110E (as shown in FIG. 1), task resumption service 113 can transmit a notification (reflecting such a log on) to server 140/task management engine 142. Moreover, in certain implementations such a notification can reflect that such a user has initiated, launched, etc. a particular application 118 on the device. In certain implementations, various aspects of operation 510 (as well as the other operations described with respect to FIG. 5) can be performed by device 110B and/or task resumption service 113 (e.g., as depicted in FIG. 1). In other implementations such aspects can be performed by one or more other elements/components, such as those described herein.

At operation 520, a first task is received (e.g., at the device that provided the notification at operation 510, such as device 110B as shown in FIG. 1). Such a first task can include various elements (e.g., application identifier, action, content item/entity, and/or operation state, each of which is described in detail above). It should be understood that the referenced task can originate from device 110A (which the user 130 was previously utilizing). The task can reflect various aspects of the execution of an application 118 at such a device 110A. Such a task is stored at task store 160 of server 140, and provided to/received by device 110B (e.g., in response to the notification provided at operation 510). As noted above, in certain implementations such a task can be received in response to the referenced notification. Additionally, in other implementations such a task(s) can be provided to/received by the device in a periodic, continuous, and/or ongoing basis. For example, as described above, in certain scenarios a task can be registered at one device and resumed at another device on an ongoing basis (e.g., to enable the user to seamlessly switch between devices).

At operation 530, a selection can be received (e.g., at device 110B as shown in FIG. 1). In certain implementations, such a selection can be a selection of a task as stored in task store 160 of server 140. For example, personal assistant engine 116 can present a graphical interface at device 110B that reflects various stored task(s) 150 that can be resumed on the device 110B. User 130 can then select one or more of the presented task(s). In doing so, the selected task can be requested from server 140.

At operation 540, a task can be resumed, e.g., device 110B. In certain implementations, such a task can be resumed in response to a selection (e.g., the selection received at operation 530). In doing so, task resumption service 113 can utilize task 150 to initialize the corresponding application (e.g., application 118A as executing on device 110B). For example, the action, entity, etc. information included in the task 150 can be used to configure application 118A on device 110B in a manner that reflects the execution of the application on device 110A (e.g., when the task was registered).

Moreover, as noted above, in certain implementations resuming a first task at a device (e.g., device 110B) can include installing an application 118 at the device. For example, task 150 can include and/or be accompanied by an instruction, link, location, etc., at which the application can be downloaded or otherwise obtained. Utilizing such an instruction, link, etc., task resumption service 113 can configure device 110E to install the corresponding application 118 (and then resume the task using the installed application).

Additionally, as noted above, various aspects of the application(s) at which a task is registered/resumed (and/or the operating system(s) on which such application(s) execute) can be accounted for in resuming the task. For example, the version of the application (and/or the OS) with respect to which a task was captured and/or the version of the application (and/or the OS) with respect to which a task is being resumed can be accounted for when resuming the task. In doing so, various aspects of the task can be updated (e.g., with respect to differences between the respective versions of the application, operating systems). In doing so, tasks captured in one context (e.g., with respect to a certain application version/OS) can be resumed within another context (e.g., with respect to a certain application version/OS).

It should also be noted that while the technologies described herein are illustrated primarily with respect to the registration and resumption of tasks, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated. Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-5 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 6 is a block diagram illustrating components of a machine 600, according to some example implementations, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. The instructions 616 transform the general, non-programmed machine into a particular machine programmed to carry out the described and illustrated functions in the manner described. In alternative implementations, the machine 600 operates as a standalone device or can be coupled (e.g., networked) to other machines. In a networked deployment, the machine 600 can operate in the capacity of a server machine or a client machine in a server-client network environment, or as a peer machine in a peer-to-peer (or distributed) network environment. The machine 600 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/storage 630, and I/O components 650, which can be configured to communicate with each other such as via a bus 602. In an example implementation, the processors 610 (e.g., a Central Processing Unit (CPU), a Reduced. Instruction Set Computing (RISC) processor, a Complex Instruction Set Computing (CNC) processor, a Graphics Processing Unit (CPU), a Digital Signal Processor (DSP), an ASIC, a Radio-Frequency Integrated Circuit (RFIC), another processor, or any suitable combination thereof) can include, for example, a processor 612 and a processor 614 that can execute the instructions 616. The term "processor" is intended to include multi-core processors that can comprise two or more independent processors (sometimes referred to as "cores") that can execute instructions contemporaneously. Although FIG. 6 shows multiple processors 610, the machine 600 can include a single processor with a single core, a single processor with multiple cores (e.g., a multi-core processor), multiple processors with a single core, multiple processors with multiples cores, or any combination thereof.

The memory/storage 630 can include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion and the grouping is in no way limiting. In various example implementations, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 650 can include biometric components 656, motion components 658, environmental components 660, or position components 662, among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., accelerometer), gravitation sensor components, rotation sensor components (e.g., gyroscope), and so forth. The environmental components 660 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 662 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 650 can include communication components 664 operable to couple the machine 600 to a network 680 or devices 670 via a coupling 682 and a coupling 672, respectively. For example, the communication components 664 can include a network interface component or other suitable device to interface with the network 680. In further examples, the communication components 664 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 can be another machine or any of a wide variety of peripheral devices (e.g., a peripheral device coupled via a USB).

Moreover, the communication components 664 can detect identifiers or include components operable to detect identifiers. For example, the communication components 664 can include Radio Frequency Identification (REID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 664, such as location via Internet Protocol (IP) geolocation, location via Wi-Fi® signal triangulation, location via detecting an NFC beacon signal that can indicate a particular location, and so forth.

In various example implementations, one or more portions of the network 680 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 can include a wireless or cellular network and the coupling 682 can be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LIE) standard, others defined by various standard-setting organizations, other long range protocols, or other data transfer technology.

The instructions 616 can be transmitted or received over the network 680 using a transmission medium via a network interface device (e.g., a network interface component included in the communication components 664) and utilizing any one of a number of well-known transfer protocols (e.g., HTTP). Similarly, the instructions 616 can be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
a processing device; and
a memory coupled to the processing device and storing instructions that, when executed by the processing device, cause the system to perform operations comprising:
receiving, from a task registration service of a first device associated with a user, a registration of a first task, the first task comprising a first application identifier that identifies a first application as executed on the first device and a first content identifier that identifies a first content item that is part of an execution of the first application, wherein receiving the registration of the first task comprises receiving the registration of the first task in response to a user input received at the first device with respect to controlling content of the first application;

receiving a notification that the user has accessed a second device; and
in response to the notification, providing the first task to a task resumption service of the second device, wherein the task resumption service of the second device, using the first application identifier and the first content identifier, automatically causes the execution of the first application with the first content item as part of the execution of the first application on the second device and wherein providing the first task further comprises providing an instruction to install the first application at the second device.

2. The system of claim 1, wherein the first task further comprises an action associated with the first application as executed on the first device.

3. The system of claim 1, wherein the first task further comprises an operation state associated with the first application as executed on the first device.

4. The system of claim 1, wherein receiving the registration of the first task comprises receiving the first task in response to a user input received at the first device with respect to the operation of the first application.

5. The system of claim 1, wherein the memory further stores instructions for causing the system to perform operations comprising receiving a second task from a second application that executes on the first device.

6. The system of claim 5, wherein providing the first task comprises providing the first task and the second task to the task resumption service of the second device.

7. The system of claim 1, wherein in response to receiving lithe notification that the user has accessed the second device, receiving, from the second device, a request for the first task.

8. The system of claim 7, wherein providing the first task comprises providing the first task to the task resumption service in response to the request.

9. A method comprising:
receiving, from a task registration service of a first device associated with a user, a registration of a first task, the first task comprising a first application identifier that identifies a first application that executes on the first device and a first content identifier that identifies a first content item that is part of an execution of the first application, wherein receiving the registration of the first task comprises receiving the registration of the first task in response to a user input received at the first device with respect to controlling content of the first application;

receiving a notification that the user has accessed a second device; and
in response to the notification, providing the first task to a task resumption service of the second device, wherein the task resumption service of the second device, using the first application identifier and the first content identifier, automatically causes the execution of the first application with the first content item as part of the execution of the first application on the second device and wherein providing the first task further comprises providing an instruction to install the first application at the second device.

10. The method of claim 9, further comprising receiving an input from the user at the first device with respect to the first application.

11. The method of claim 10, further comprising registering the first task in response to receiving the input.

12. The method of claim 9, further comprising registering a second task, the second task being related to a second application executing on the first device.

13. The method of claim 12, wherein providing the first task comprises providing the first task and the second task to the task resumption service of the second device.

14. The method of claim 9, further comprising in response to receiving the notification that the user has accessed the second device, receiving, from the second device, a request for the first task.

15. The method of claim 14, wherein providing the first task comprises providing the task to the task resumption service in response to the request.

16. A non-transitory computer readable medium having instructions stored thereon that, when executed by at least one processor, cause the at least one processor to perform operations comprising:

receiving, from a task registration service of a first device associated with a user, a registration of a first task, the first task comprising a first application identifier that identifies a first application as executed on the first device and a first content identifier that identifies a first content item that is part of an execution of the first application, wherein receiving the registration of the first task comprises receiving the registration of the first task in response to a user input received at the first device with respect to controlling content of the first application;

receiving a notification that the user has accessed a second device; and in response to the notification, providing the first task to a task resumption service of the second device, wherein the task resumption service of the second device, using the first application identifier and the first content identifier, automatically causes the execution of the first application with the first content item as part of the execution of the first application on the second device and wherein providing the first task further comprises providing an instruction to install the first application at the second device.

17. The computer-readable medium of claim 16, further including instructions that cause the at least one processor to perform an operation of receiving a second task from a second application that executes on the first device.

18. The computer-readable medium of claim 17, wherein providing the first task comprises providing the first task and the second task to the task resumption service of the second device.

19. The computer-readable medium of claim 16, wherein in response to receiving the notification that the user has accessed the second device, receiving, from the second device, a request for the first task.

20. The computer-readable medium of claim 19, wherein providing the first task comprises providing the first task to the task resumption service in response to the request.

* * * * *